(12) United States Patent
Abbott, III et al.

(10) Patent No.: US 6,363,195 B1
(45) Date of Patent: Mar. 26, 2002

(54) MULTIMODE FIBER LINK DISPERSION COMPENSATOR

(75) Inventors: John S. Abbott, III, Elmira; Greg E. Smith; Carlton M. Truesdale, both of Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/530,211

(22) PCT Filed: Oct. 6, 1998

(86) PCT No.: PCT/US98/20960

§ 371 Date: Apr. 27, 2000

§ 102(e) Date: Apr. 27, 2000

(87) PCT Pub. No.: WO99/22471

PCT Pub. Date: May 6, 1999

Related U.S. Application Data

(60) Provisional application No. 60/063,625, filed on Oct. 27, 1997.

(51) Int. Cl.[7] .............................. G02B 6/16; G02B 6/26
(52) U.S. Cl. ......................................... 385/123; 385/15
(58) Field of Search ........................... 385/15, 24, 27, 385/50, 123–128; 359/161

(56) References Cited

U.S. PATENT DOCUMENTS

| 4,229,067 A | | 10/1980 | Love ........................ 350/96.15 |
| 4,723,828 A | | 2/1988 | Garel-Jones et al. ...... 350/96.15 |
| 4,768,853 A | * | 9/1988 | Bhagavatula ................ 385/31 |
| 5,185,827 A | * | 2/1993 | Poole ........................... 385/28 |

OTHER PUBLICATIONS

K. Morishita et al., Compensation of Intermodal Dispersion by Splicing Two Graded–Index Multimode Fibers, IEEE Transactions on Microwave Theory and Techniques, vol. 30, No. 5, May 1982, pp. 694–700.

A.B. Puc et al., "Pulse Broadening Compensation in Fiber–Optical Links", Electronics Letters, vol. 16, No. 5, Feb. 1980, pp. 162–163.

* cited by examiner

Primary Examiner—John D. Lee
(74) Attorney, Agent, or Firm—William J. Chervenak

(57) ABSTRACT

Disclosed is a dispersion compensated multimode waveguide fiber link. The dispersion of essentially any wavelength can be compensated by adding a compensating waveguide fiber to the link, the compensating waveguide having a profile shape and a $\lambda_p$ wavelength which counters dispersion caused by the original waveguide fiber of the link. Analytical expressions relating the compensator waveguide profile and $\lambda_p$ to the original link and compensated profile and $\lambda_p$ are provided for the embodiment which includes a profiles.

14 Claims, 2 Drawing Sheets

MULTIMODE FIBER LINK DISPERSION COMPENSATOR

This application claims benefit to Provisional Application No. 60/063,625 Oct. 27, 1997.

BACKGROUND OF THE INVENTION

The invention relates to a dispersion compensated multimode waveguide link which includes a compensating multimode optical waveguide fiber which is optically coupled to the link to increase bandwidth at one or more preselected wavelengths.

Multimode optical waveguide fiber has long been preferred for use in shorter link length systems, such as local area networks, in which the link length is typically less than 5 km and the data transmission rate is of the order of hundreds of Mbits/sec. The large core diameter of multimode waveguides, typically 50 $\mu$m, 62.5 $\mu$m, 100 $\mu$m or larger, allows for low loss splicing and connecting loses. In addition, multimode waveguides provide for operation at two wavelength windows, centered around 850 nm and 1300 nm, and have sufficient bandwidth at both wavelengths to meet local area network data rate requirements.

Because the waveguide attenuation at the 1300 nm window of operation is lower, the multimode waveguide manufacturing process may be adjusted to provide higher bandwidth at the higher wavelength window. This adjustment provides a higher wavelength window capable of carrying higher data rates over longer distances, in comparison to the lower wavelength window. In this way full use is made of the lower attenuation at 1300 nm. Thus, for example, multimode fibers having a bandwidth of 160 MHz-km at 850 nm and 500 MHz-km at 1300 nm (160/500 fiber) has been specified for many local network or other short length applications.

Applications in which bandwidth is optimized at lower operating windows is required in certain systems. In these cases, the wavelength of peak bandwidth is moved to a lower wavelength such as 780 nm or 850 nm.

However, as laser sources at the lower window have become more powerful, narrower in line width, and relatively free of chirp, a need has arisen for higher bandwidth in the wavelength region centered on 850 nm. In addition, for certain local area net applications the demand for increased bit rate continues. Thus a practical need has arisen for higher bandwidth in the 850 nm window while maintaining sufficient bandwidth in the 1300 nm window.

Because many networks have been installed using the two window bandwidth values of 160 MHz-km and 500 MHz-km at the respective 850 nm and 1300 nm windows, a search has been undertaken to find an economically feasible way to adjust or compensate the two window bandwidths in installed multimode waveguide fiber links.

Definitions

Refractive Index profile is a statement of the value of the refractive index of a material along a line having a first and a last point. In the case of an optical waveguide fiber, a value of refractive index profile is defined at each point along a waveguide radius.

A general expression for an index profile is, $$n^2(r)=n_1^2[1-2\Delta f(r/a)],$$

in which.

$n(r)$ is the refractive index at a point r on the waveguide radius, $n_1$ is the refractive index on the waveguide centerline, $\Delta=(n_1^2-n_2^2)/2n_1^2$, in which $n_2$ is a reference refractive index usually taken as the minimum value of the clad layer index, and $f(r/a)$ is a function of r divided by the core radius a.

An $\alpha$-profile is a refractive index profile in which $f(r/a)=(r/a)^\alpha$.

Bandwidth is a standard measure of the dispersive property of a waveguide over a range of frequencies. In particular, the bandwidth of a waveguide is the range of frequencies over which the power penalty due to dispersion is less than 3 dB where the launched power is used as the comparison base. Bandwidth may be expressed in normalized frequency units, MHz-km, which is the bandwidth of a 1 km length of waveguide. When the bandwidth units are expressed simply as MHz, the bandwidth value is representative of the total length of waveguide measured. For example, a waveguide which is 2 km in length, having a normalized bandwidth of 500 MHz -km, has an end to end bandwidth of (500 MHz-km)/2 km=250 MHz.

SUMMARY OF THE INVENTION

There is a need for a technically sound, low cost way to compensate the bandwidth at one of the two operating wavelength windows. Further, this need exists in certain applications to compensate one wavelength window without unduly sacrificing bandwidth at the other wavelength window. It is contemplated that a refractive index profile $n(r)$ may be found which has a local maximum near a selected wavelength window to be compensated and a local maximum at another selected wavelength window of operation. The present invention meets the need for such a multimode link bandwidth compensator.

A first aspect of the invention is a dispersion compensated multimode link comprising a first multimode fiber length, which has an index profile which provides for respective preselected bandwidths at a first and second wavelength window. The multimode waveguide has a core region and a surrounding clad layer. The core region has a circular cross section of radius a, the radius measured from the waveguide centerline. In a shorthand notation, the multimode waveguide is said to have bandwidth $BW_1$ at wavelength $\lambda_1$ and a bandwidth $BW_2$ at wavelength $\lambda_2$. Although the profile $n_1(r)$ may take many forms, the profile in general produces a bandwidth vs. wavelength curve which has a local maximum at a wavelength $\lambda_{p1}$. A respective target bandwidth at each of two operating windows is realized by a combination of the location of $\lambda_{p1}$ relative to $\lambda_1$ and $\lambda_2$, and the maximum bandwidth which is located at wavelength $\lambda_{p1}$. In order to reach the respective target bandwidths at each of the two windows, the profile is designed such that the maximum or peak bandwidth occurs at a wavelength $\lambda_{p1}$ which lies between the center wavelengths of the two operating windows, $\lambda_1$ and $\lambda_2$. The bandwidth vs. wavelength response of the waveguide may be calculated from the geometry and index profile of the waveguide. The mathematical relationships are quite complex even when mode coupling and mode mixing are not taken into account. Even using numerical methods and a computer, usually some simplifying assumptions must be made. Thus the term "mathematically derivable" is used in this document to mean a particular set of waveguide fiber properties, specifically the refractive index profile and the core and clad geometry, can be used;

to estimate relative mode delay, to predict $\lambda_p$, or
to estimate bandwidth at $\lambda_p$.

The agreement between calculated and experimental compensation waveguide parameters, given below, demonstrates the validity of the assumptions used in this application.

The compensated link is completed by optically joining a second multimode waveguide fiber to the first fiber. The second multimode waveguide has an index profile, $n_2(r)$ which compensates the relative modal delays which occur in the first waveguide. One method of compensation makes use of a compensating waveguide which has maximum bandwidth at a wavelength, $\lambda_{p2}$. An example of such a profile is an a profile. By placing $\lambda_{p2}$ outside the wavelength interval defined by $\lambda_1$ and $\lambda_2$ one of the bandwidths, that of the higher wavelength window or that of the lower wavelength window can be compensated by the second fiber. In the case in which the profile errors in the first waveguide are α errors, the compensating waveguide cannot in general correct the group delay of the modes at both $\lambda_1$ and $\lambda_2$ so that the increase in one bandwidth is made at the expense of the other. This is because the change in a produces a change in $\lambda_p$ and so shifts the bandwidth vs. wavelength curve toward a higher or the lower wavelength.

When the profile errors which reduce bandwidth are more random or non-α in nature, it is possible to compensate both the high wavelength window bandwidth and the low wavelength window bandwidth with a single compensating waveguide. Thus, in general it is proper to stipulate that at least one bandwidth may be compensated. An alternative statement is that the compensating waveguide may function to equalize mode group delay at more than one wavelength.

Note that the compensated bandwidths, $BW_{comp1}$ and $BW_{comp2}$ are expressed in MHz. In this way, the end to end bandwidth of the waveguide fiber is compared before and after compensation. The compensation must be sufficient to improve the end to end bandwidth in MHz even though the link has been made longer by the compensating waveguide.

In a preferred embodiment of the compensated multimode link, either the first or second multimode waveguide has an α-profile, defined above, in which α lies in the range of about 0 to 8. This choice of index profile allows one to equalize mode group delay at a selected wavelength and is flexible enough to provide acceptable bandwidth for operation at both the 1300 nm and 850 nm window. The calculation of compensation waveguide parameters is also made easier by the choice of α profiles.

In a most preferred embodiment, both the first and second multimode wavelengths comprising the link have respective α profiles. For this refractive index profile choice, working relationships among the parameters of the compensated link, the first waveguide, and the second waveguide take a particularly simple form.

A first waveguide fiber having an a $\alpha=\alpha_1$ in the range $0.8 \leq \alpha_1 < 2.1$, may be compensated by a second waveguide fiber having an a $\alpha=\alpha_2$ in the range $\alpha_1 \leq \alpha_2 \leq 8$. This choice serves to increase the bandwidth at a lower wavelength operating point such as 850 nm. Using the same $\alpha_1$ for the first fiber, the bandwidth at a higher wavelength operating point, such as 1300 nm, may be increased by using a second, i.e., compensation, waveguide having an $\alpha_2$ in the range $0.8 \leq \alpha_2 \leq \alpha_1$.

Defining $\alpha_1$ as characteristic of the first waveguide, $\alpha_2$ as characteristic of the second or compensating waveguide, and $\alpha_{comp}$ as characteristic of the compensated link, then, for increasing the lower wavelength bandwidth, $\alpha_{lcomp}=(\alpha_1+c\alpha_2)/(1+c)$, in which, $c=L_2/L_1$, where $L_1$ is the length of the first waveguide, $L_2$ is the length of the second waveguide, and c is a number in the range 0 to 1. Likewise, if the higher wavelength bandwidth is compensated, $\alpha_{hcomp}=(\alpha_1+c\alpha_2)/(1+c)$.

In a second aspect of the invention, the refractive index profile of the first length, $L_1$, takes the form, $n_1(r)=n_{cl1}^2[1-2\Delta_1 f_1(r/a_1)]$, in which, $n_{cl1}$ is the refractive index on centerline and $a_1$ is the core radius. The relative index $\Delta_1$ is referenced to the minimum value of the clad layer refractive index $n_{c1}$. The second multimode length has an index profile of the same form, $n_2^2(r)=n_{cl2}^2[1-2\Delta_2 f(r/a_2)]$. The combination of the first and second fiber may be chosen to compensate bandwidth at either a higher or lower operating wavelength.

In a preferred embodiment, either $f_1(r/a_1)$ or $f_2(r/a_2)$ has the form $(r/a)^\alpha$, i.e. an α profile.

In a most preferred embodiment, both the first and second waveguides have respective α profiles. The limits and relationships of the respective α's, $\alpha_1$ for the first fiber, $\alpha_2$ for the second fiber, and $\alpha_{comp}$ for the combination of the two fibers, are as stated above.

The most advantageous operating windows for multimode waveguide fiber are centered at 850 nm and 1300 nm. At these wavelengths, and in an interval +/−30 nm about these wavelengths, the attenuation vs. wavelength characteristic shows a local minimum.

In a particular embodiment of the invention, a link having $\lambda_{p1}$ in the range of about 1150 nm to 1250 nm, is compensated at the 850 nm operating point by optically joining a compensating waveguide having $\lambda_{p2}$ in the range of about 450 nm to 650 nm. Further characteristics of this embodiment are given in an example below.

In keeping with the purpose of the compensated link, i.e., to increase data rate, the preferred embodiments of the invention are those in which the length of the compensation or second waveguide is minimum. Thus a preferred embodiment of the invention is one in which the α of the compensation fiber is large compared to that of the first fiber. The larger α provides equal compensation using shorter compensation lengths as compared to a compensation waveguide of lower α. The fractional length c, $c=L_2/L_1$, which is the range 0 to 1, has a preferred range of 0.01 to 0.50. In cases of α in the range of about 2.5 to 3, the preferred range of c is reduced to about 0.01 to 0.25.

DETAILED DESCRIPTION OF THE INVENTION

High bandwidth multimode waveguide fiber may be manufactured by adding refractive index altering, glass forming metal oxides to a silica based glass. When a glass is called silica based, the weight percent $SiO_2$ is typically not less than 70% by weight. Bandwidth is made to be a maximum when the travel time of each mode in the waveguide is as close as possible to the travel time in the waveguide of every other mode. In the ideal case, the index profile is shaped to provide equal optical paths for all the modes. Departure from the ideal profile shape, i. e. profile errors, results in relative delays between modes. These relative delays spread or disperse a light signal, which consists of many modes.

The subject invention is directed to a multimode fiber link in which the signal dispersion due to the profile errors either from manufacturing imperfections or optimization at an incorrect wavelength of a first portion of the link are compensated by the remaining portion of the link.

A primary feature of the invention is that compensating profiles have been found which provide for adequate profile error correction while keeping the length of the compensating waveguide as short as possible. Adding length to a link adds attenuation and, because no waveguide is perfect, the added length also introduces some mode group delay differences due to its own profile errors. Advantageously, the profile control possible in current waveguide manufacturing processes is such that the gain in bandwidth provided by the compensating fiber improves overall link performance despite the attenuation and profile error present in the compensating waveguide.

Figure 1:
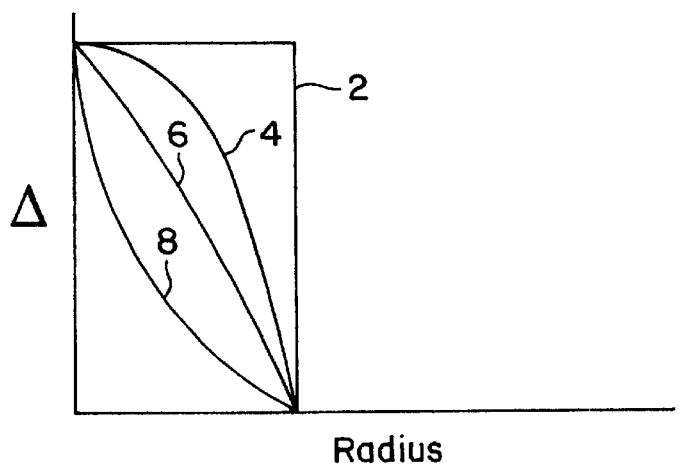
FIG. 1 is a chart of relative index Δ vs. radius for alternative α profiles.

Example refractive index profiles are illustrated in FIG. 1 which is a chart of relative refractive index, $\Delta$, versus waveguide radius. Profile 2 is a step index which may be approximated by an $\alpha$ profile in which $\alpha$ is very large. For most manufactured step index profiles, an $\alpha$ greater than about 8 provides an accurate description of the variation of index with radius. Profile 4 of FIG. 1 is a parabola described by an $\alpha$ profile having $\alpha=2$. Profile 6 is triangular having $\alpha=1$ and profile 8 is an example of a profile having $\alpha<1$. FIG. 1 serves to show the flexibility of the $\alpha$ profiles. More complex profiles can be described in terms of the $\alpha$ profile by dividing the core region into radial segments and assigning a particular $\alpha$ to each segment.

Figure 4:
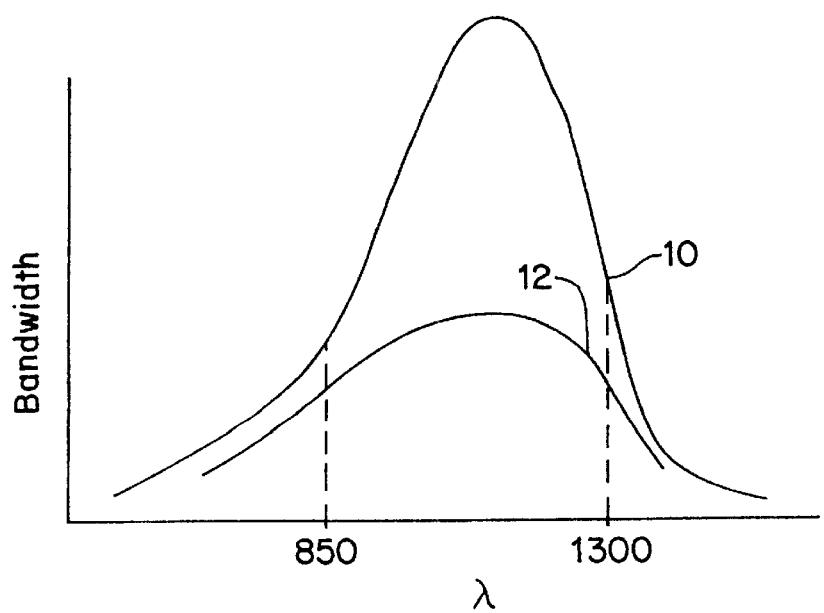
FIG. 4 is an illustrative chart of bandwidth at 850 nm vs. the fractional amount of compensating fiber added to a link.

Because the glass refractive index changes with wavelength, a multimode waveguide can have a refractive index which equalizes mode delay over a narrow band of wavelengths. The bandwidth reaches a maximum value at a wavelength within this narrow band. The bandwidth decreases at wavelengths above and below the wavelength of maximum bandwidth. Two curves of bandwidth versus wavelength are shown in FIG. 4. Bandwidth curve 10 is more sharply peaked than is bandwidth curve 12, because the refractive index which provides bandwidth curve 10 has fewer errors which result in unequal mode delays. Note that although bandwidth curve 12 contains more profile errors, as evidenced, by the decreased maximum bandwidth, the bandwidths of curves 10 and 12 at the operating windows 850 nm and 1300 nm are nearly equal. When designing a profile for dual window operation, a sharply peaked bandwidth versus wavelength curve may not be as effective as one which is flatter but more nearly constant over an extended wavelength range.

FIG. 4 also shows how the bandwidth at 1300 nm may be altered relative to the bandwidth at 850 nm. The mode groups of a signal at 1300 nm have a different range of optical paths as compared to the mode groups of a signal at 850 nm. By adjusting the amount of refractive index altering dopant in the waveguide along the waveguide radius, one may provide better mode delay compensation for either the modes at the higher wavelength or for the modes at the lower wavelength. In effect, one may move the maximum bandwidth of the bandwidth versus wavelength curve to higher or lower wavelength values. For example, the wavelength of maximum bandwidth, $\lambda_p$, may be made to coincide with either 1300 nm or 850 nm and so move the maximum of bandwidth to one or the other of these operating wavelengths. Choosing a value of $\lambda_p$ which lies between 1300 nm and 850 nm, decreases the bandwidth at one wavelength while increasing bandwidth at the other window.

Optically joining multimode waveguide fibers having $\lambda_p$ values which are spaced apart will produce different mode group delays of the signal in the different waveguides so that a measurement of bandwidth versus wavelength of such a set of joined waveguides will yield a $\lambda_p$ which is between the spaced apart $\lambda_p$'s.

The present invention uses the capability of placing $\lambda_p$ at a preselected wavelength in a given multimode waveguide to adjust the $\lambda_p$ of an installed link and thus change the bandwidth of the link at a particular operating wavelength. A length of multimode fiber, the compensation fiber, having a $\lambda_p$ spaced apart from the $\lambda_p$ of the installed link is optically joined to the link to provide a compensated link having an altered $\lambda_p$ and an altered bandwidth versus wavelength characteristic. Because the compensating waveguide fiber length is added to the existing link, it is important that the compensating waveguide be as short as possible. The present invention meets this requirement by making the $\lambda_p$ of the compensator either very large high, i.e. above 1300 nm, or very low, i.e, below 850 nm. This choice of $\lambda_p$ provides for compensation at the high or low wavelength operating point while maintaining compensation fiber length less than or equal to the original link length. As will be seen in the examples below, effective compensation is possible using compensating fiber lengths in the range of 1% to 50% of the original link length. It is precisely this feature which makes the compensator fiber a practical tool in adjusting link bandwidth.

Figure 3:
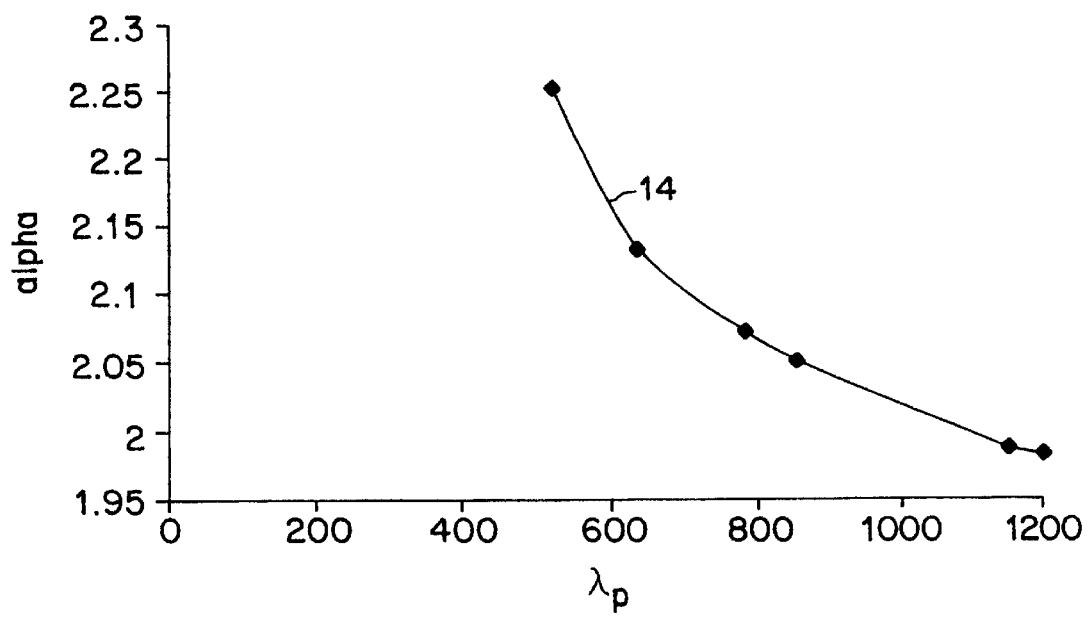
FIG. 3 is a chart of α vs. $\lambda_p$ for a example multimode waveguide fiber.

The $\lambda_p$ of a compensator waveguide may be adjusted by adjusting the $\alpha$ of an $\alpha$ profile compensator. An illustrative chart of $\alpha$ vs. $\lambda_p$ is shown as curve 14 in FIG. 3. Note that an $\alpha$ of about 2.25 provides a $\lambda_p$ of about 500 nm and an $\alpha$ of about 1.97 provides a $\lambda_p$ of about 1200 nm.

EXAMPLE 1

Compensation Waveguide Having $\alpha$ of 2.21

Four multimode waveguide fibers were each in turn optically joined to a compensator waveguide fiber having an $\alpha$ of 2.21. The bandwidths in MHz, measured using an overfilled launch condition (NA and spot size of source larger than those of the fiber) for compensation lengths of 2%, 10%, 27%, and 50% of the first length are shown in Table 1.

TABLE 1

|  | BW 850/1300 MHz c = 0 | BW 850/1300 MHz c = 2% | BW 850/1300 MHz c = 10% | BW 850/1300 MHz c = 27% | BW 850/1300 MHz c = 50% |
|---|---|---|---|---|---|
| $\alpha = 2.21$ |  |  |  |  |  |
| Fiber #1 | 92/328 | 106/333 | 111/435 | 121/459 | 134/291 |

TABLE 1-continued

| $\alpha = 2.21$ | BW 850/1300 MHz c = 0 | BW 850/1300 MHz c = 2% | BW 850/1300 MHz c = 10% | BW 850/1300 MHz c = 27% | BW 850/1300 MHz c = 50% |
|---|---|---|---|---|---|
| Fiber #2 | 95/525 | 113/742 | 119/755 | 126/552 | 139/305 |
| Fiber #3 | 106/841 | 127/920 | 133/943 | 152/451 | 177/247 |
| Fiber #4 | 99/579 | 110/478 | 116/782 | 125/447 | 143/277 |

The four fibers under test were each about 1.73 km in length. The same compensating fiber was used in each of the four test links. The effect of the compensating waveguide fiber on bandwidth at both 850 nm and 1300 nm are given. The bandwidth at 850 nm increases as the fractional length, c, of the compensating fiber increases from 2% to 50%, where c is defined as the ratio of compensator length to original fiber length. The bandwidth measured bandwidth in MHz is the end to end bandwidth in each case and so includes the link length increase due to addition of the compensating waveguide. At compensator fractional lengths up to about 27%, the bandwidth at 1300 nm is also increased by addition of the compensator. This increase is probably due to a mode stripping or mode mixing action of the compensator which offsets the shift of $\lambda_p$ to shorter wavelengths.

The benefit due to the compensator waveguide is achieved for waveguides having low bandwidth 1300 nm, fiber #1, high bandwidth 1300 nm, fiber #3, and moderate 1300 nm bandwidth, fibers #2 and #4.

Figure 2:
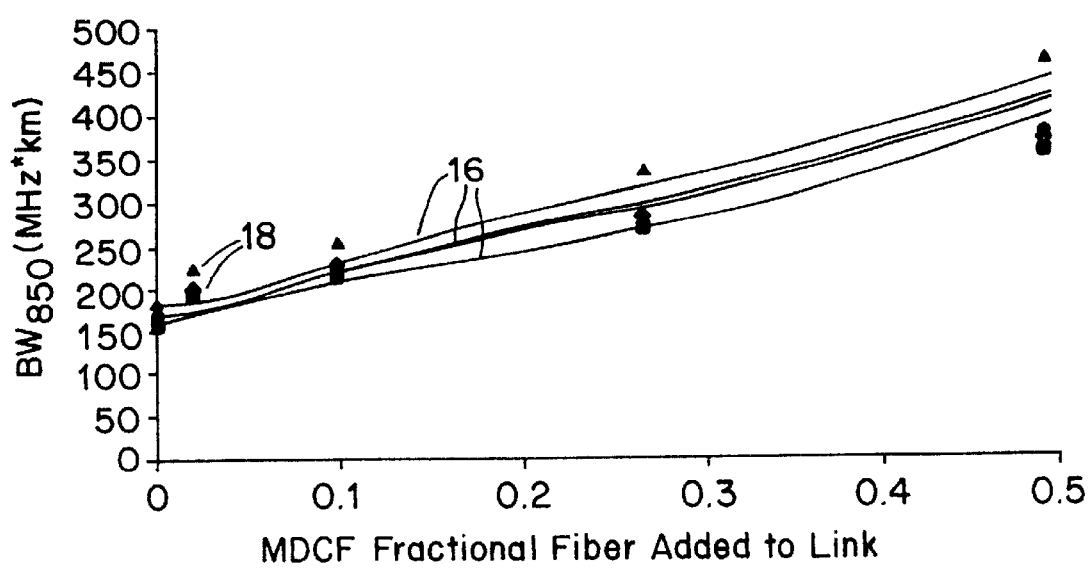
FIG. 2 is a chart of compensated bandwidth vs. fractional length of compensating waveguide at 850 nm. Four compensating waveguides are shown.

A chart of the 850 nm data of Table 1, normalized to a 1 km length, is shown in FIG. 2. The symbols show the actual data points and the lines are fitted using a linear model in which the a characteristic of the system, $\alpha_{comp}$, is written in terms of the $\alpha$ of the original link, $\alpha_1$, and the $\alpha$ of the compensator waveguide, $\alpha_2$. That is, $\alpha_{comp} = (\alpha_1 + c\alpha_2)/(1+c)$. This equation may be solved for the fractional length c as, $c = (\alpha_1 - \alpha_{comp})/(\alpha_{comp} - \alpha_2)$. This equation offers a good approximation of c for $\alpha$ values in the range of about 0.5 to 6. A more exact relationship, which includes intermodal correlation coefficients, is found in the work of M. Eve, cited immediately below.

The data also shows good agreement with a multipath time dispersion model set forth in, Opt. Quant. Electr., 10, 41–51, 1978, "Multipath time dispersion theory of an optical network", M. Eve. In this model the compensated bandwidth in GHz is expressed in terms of the original bandwidth in GHz, the rms pulse width in the original link, $\sigma_1$, the rms pulse width in the original link plus the compensator, $\sigma_2$, as, $$BW_{comp} = BW_1(1/\{1-(m\sigma_2/\sigma_1)\}).$$

The models fit the data points closely enough that the models are useful in predicting the properties of the compensator waveguide as well as the performance of the compensated system.

Note that the expression for $BW_{comp}$ predicts very high compensated bandwidth for choices of m for which the term $m\sigma_2/\sigma_1$ is close to one. Thus there is an optimum choice of m for any given multimode link.

Comparative Example

Compensator Waveguide having a $\alpha = 3$

The four multimode waveguide fibers of example were compensated with a different fiber having a higher $\alpha$, particularly an $\alpha$ in the range of 2.5 to 3.0. Table 2 shows the bandwidth measurements at 4 compensator lengths.

TABLE 2

| $\alpha \cong 3$ | BW 850/1300 MHz c = 0 | BW 850/1300 MHz c = 0.65% | BW 850/1300 MHz c = 9.4% | BW 850/1300 MHz c = 27% | BW 850/1300 MHz c = 50% |
|---|---|---|---|---|---|
| Fiber #1 | 92/328 | 104/319 | 127/354 | 147/117 | 76/46 |
| Fiber #2 | 95/525 | 110/527 | 129/347 | 139/112 | 75/45 |
| Fiber #3 | 106/841 | 125/820 | 153/314 | 132/98 | 61/42 |
| Fiber #4 | 99/579 | 111/538 | 131/303 | 137/101 | 67/43 |

In the case of the higher $\alpha$ compensator fiber the benefits of compensation occur at much shorter compensator lengths. The $\alpha = 3$ compensator begins to dominate the link performance at length percent in the range of about 12% to 25%, which sets a practical upper limit on compensator fiber length. This is seen in Table 3 in which the bandwidth performance of the link was measured at points between 9.4% and 27%.

TABLE 3

| $\alpha \cong 12$ | BW 850/1300 MHz c = 12% | BW 850/1300 MHz c = 14% | BW 850/1300 MHz c = 16% | BW 850/1300 MHz c = 19% | BW 850/1300 MHz c = 21% | BW 850/1300 MHz c = 24% |
|---|---|---|---|---|---|---|
| Fiber #1 | 134/342 | 145/315 | 145/235 | 151/195 | 151/173 | 150/148 |
| Fiber #2 | 145/418 | 152/297 | 153/225 | 164/191 | 162/164 | 166/141 |
| Fiber #3 | 179/300 | 193/254 | 196/196 | 207/170 | 209/146 | 206/125 |

TABLE 3-continued

| α ≅ 12 | BW 850/1300 MHz c = 12% | BW 850/1300 MHz c = 14% | BW 850/1300 MHz c = 16% | BW 850/1300 MHz c = 19% | BW 850/1300 MHz c = 21% | BW 850/1300 MHz c = 24% |
|---|---|---|---|---|---|---|
| Fiber #4 | 148/312 | 159/288 | 166/211 | 164/176 | 169/153 | 171/137 |

The compensation at the 850 nm operating window is seen to go through a maximum for compensation fiber lengths between 16% and 25% of the first fiber.

Table 4 shows the relative influence that different compensator waveguides have on $\lambda_p$. In Table 4 is given the length of compensator waveguide, having a particular α, sufficient to move the link $\lambda_p$ from about 1200 nm to 1150 nm.

TABLE 4

| % Length of Compensator | α of Compensator |
|---|---|
| 0.53 | 3.0 |
| 2.0 | 2.25 |
| 3.6 | 2.13 |
| 6.0 | 2.07 |

The benefit derived from the higher α compensator is evident.

Although particular embodiments of the invention have been disclosed and described, the invention is nonetheless limited only by the following claims.

We claim:

1. A dispersion compensated multimode waveguide fiber link comprising:

a first length of multimode waveguide having a long dimension $L_1$, a centerline along the long dimension, a refractive index profile $n_1(r)$ extending over a central core region of circular cross section and radius $a_1$, the center of the circular region lying on the centerline;

a clad layer, having a minimum thickness, $t_1$, surrounding and contacting the core region having a minimum refractive index $n_{c1}$, in which at least a portion of the profile $n_1(r)$ is greater than $n_{c1}$;

the profile $n_1(r)$ providing a first bandwidth, $BW_1$, at wavelength $\lambda_1$, a maximum bandwidth, $BW_{p1}$, at wavelength $\lambda_{p1}$, and a second bandwidth, $BW_2$, at wavelength $\lambda_2$, $BW_1$, $BW_2$, and $BW_{p1}$ being mathematically derivable from $n_1(r)$, $n_{c1}$, $a_1$, and $t_1$, in which $\lambda_1 \leq \lambda_{p1} \leq \lambda_2$;

a second length of multimode waveguide, optically joined to the first length of multimode waveguide, having a long dimension $L_2$, a centerline along the long dimension, refractive index profile $n_2(r)$ extending over a central core region of circular cross section and radius $a_2$, the center of the circular region lying on the centerline;

a clad layer, having a minimum thickness, $t_2$, surrounding and contacting the core region having a minimum refractive index $n_{c2}$, in which at least a portion of the profile $n_2(r)$ is greater than $n_{c2}$;

the profile $n_2(r)$ providing a third bandwidth, $BW_3$, at wavelength $\lambda_1$, a maximum bandwidth, $BW_{p2}$, at wavelength $\lambda_{p2}$, and a fourth bandwidth, $BW_4$, at wavelength $\lambda_2$, $BW_3$, $BW_4$, and $BW_{p2}$ being mathematically derivable from $n_2(r)$, $n_{c2}$, $a_2$, and $t_2$, in which, $\lambda_{p2} \leq \lambda_1$ or $\lambda_{p2} \geq \lambda_2$;

the combination of the first and second multimode waveguides forming a compensated multimode waveguide link of length $L_1+L_2$, and having a bandwidth, $BW_{comp1}$ in MHz at $\lambda_1$, a bandwidth, $BW_{comp2}$ in MHz at $\lambda_2$, in which at least one of $BW_{comp1}$ or $BW_{comp2}$ is greater than $BW_1$ or $BW_2$, in MHz, respectively.

2. The dispersion compensated multimode link of claim 1 in which $n_1(r)$ is an α profile having $α=α_1$ and $0<α_1 \leq 8$.

3. The dispersion compensated multimode link of claim 1 in which $n_2(r)$ is an 60 profile having $α=α_2$ and $0<α_2 \leq 8$.

4. The dispersion compensated multimode link of claim 1 in which $n_1(r)$ and $n_2(r)$ are α profiles having $α=α_1$, and $0.8 \leq α_1 \leq 2.1$ and having $α=α_2$ and $α_1 \leq α_2 \leq 8$, respectively, the compensated link being characterized by an $α=α_{comp}$ and $0.8 < α_{comp} < α_2$ and $L_2=cL_1$, in which $0<c<1$, and $c=(α_1-α_{comp})/(α_{comp}-α_2)$.

5. The dispersion compensated multimode link of claim 1 in which $n_1(r)$ and $n_2(r)$ are α profiles having $α=α_1$, and $0.8<α_1 \leq 2.1$ and having $α=α_2$ and $0.8 \leq α_2<α_1$, respectively, the compensated link being characterized by an $α=α_{comp}$ and $0.8<α_{comp}<2$ and $L_2=cL_1$, in which $0<c<1$, and $c=(α_1-α_{comp})/(α_{comp}-α_2)$.

6. The dispersion compensated multimode link of either one of claim 4 or 5 in which $0.01 \leq c \leq 0.50$.

7. A dispersion compensated multimode waveguide fiber link comprising:

a first length of multimode waveguide having a long dimension $L_1$, a centerline along the long dimension, a centerline refractive index $n_{c/1}$, a relative index $\Delta_1$, a refractive index profile $n_1^2(r)=n_{c/1}^2[1-2\Delta_1 f_1(r/a_1)]$, extending over a central core region of circular cross section and radius $a_1$, the center of the circular region lying on the centerline;

a clad layer, having a minimum thickness, $t_1$, surrounding and contacting the core region having a minimum refractive index $n_{c1}$, in which at least a portion of the profile $n_1(r)$ is greater than $n_{c1}$, and $n_{c1}$ is the reference index for relative index $\Delta_1$;

the profile $n_1(r)$ providing a first bandwidth, $BW_1$, at wavelength $\lambda_1$, a maximum bandwidth, $BW_{p1}$, at wavelength $\lambda_{p1}$, and a second bandwidth, $BW_2$, at wavelength $\lambda_2$, $BW_1$, $BW_2$, and $BW_{p1}$ being mathematically derivable from $n_1(r)$, $n_{c1}$, $a_1$, and $t_1$, in which $\lambda_1 \leq \lambda_{p1} \leq \lambda_2$;

a second length of multimode waveguide, optically joined to the first length of multimode waveguide, having a long dimension $L_2$, a centerline along the long dimension, a refractive index on centerline of $n_{c/2}$, a relative refractive index $\Delta_2$ refractive index profile $n_2^2(r)=n_2^2[1-2\Delta_2 f(r/a_2)]$, extending over a central core region of circular cross section and radius $a_2$, the center of the circular region lying on the centerline;

a clad layer, having a minimum thickness, $t_2$, surrounding and contacting the core region having a minimum refractive index $n_{c2}$, in which at least a portion of the profile $n_2(r)$ is greater than $n_{c2}$;

the profile $n_2(r)$ providing a third bandwidth, $BW_3$, at wavelength $\lambda_1$, a maximum bandwidth, $BW_{p2}$, at wavelength $\lambda_{p2}$, and a fourth bandwidth, $BW_4$, at wavelength $\lambda_2$, $BW_3$, $BW_4$, and $BW_{p2}$ being mathematically derivable from $n_2(r)$, $n_{c2}$, $a_2$, and $t_2$, in which, $\lambda_{p2} \leq \lambda_1$ or $\lambda_2 \leq \lambda_{p2}$;

the combination of the first and second multimode waveguides forming a compensated multimode waveguide link of length $L_1+L_2$, and having a bandwidth, $BW_{comp1}$, in MHz at $\lambda_1$, a bandwidth, $BW_{comp2}$, in MHz at $\lambda_2$, in which at least one of $BW_{comp1}$ or $BW_{comp2}$ is greater than $BW_1$ or $BW_2$, respectively.

8. The dispersion compensated multimode link of claim 7 in which $f_1(r/a_1)=(r/a_1)^{\alpha 1}$ and $0<\alpha_1 \leq 8$.

9. The dispersion compensated multimode link of claim 7 in which $f_2(r/a_2)=(r/a_2)^{\alpha 2}$ and $0<\alpha_2 \leq 8$.

10. The dispersion compensated multimode link of claim 7 in which $f_1(r/a_1)=(r/a_1)^{\alpha 1}$ and $f_2(r/a_2)=(r/a_2)^{\alpha 2}$, having $1.8 \leq \alpha_1 \leq 2.1$, and $\alpha_1 \leq \alpha_2 \leq 8$, respectively, the compensated link being characterized by an $\alpha=\alpha_{comp}$ and $1.8<\alpha_{comp}<\alpha_2$ and $L_2=cL_1$, in which $0<c<1$, and $c=(\alpha_1-\alpha_{comp})/(\alpha_{comp}-\alpha_2)$.

11. The dispersion compensated multimode link of claim 7 in which $f_1(r/a_1)=(r/a_2)^{\alpha 1}$ and $f_2(r/a_2)=(r/a_2)^{\alpha 2}$, having $0.8<\alpha_1 \leq 2.1$ and $\alpha_1 \leq \alpha_2 <8$, respectively, the compensated link being characterized by an $\alpha=\alpha_{comp}$ and $0.8<\alpha_{comp} 21 \alpha_2$ and $L_2=cL_1$, in which $0<c<1$, and $c=(\alpha_1-\alpha_{comp})/(\alpha_{comp}-\alpha_2)$.

12. The dispersion compensated multimode link of either one of claim' 10 or 11 in which $0.01 \leq c \leq 0.50$.

13. The dispersion compensated multimode link of claim 11 in which $\lambda_{p1}$ is in the range of about 1150 nm to 1250 nm and $\lambda_{p2}$ is in the range of about 450 nm to 650 nm.

14. The dispersion compensated multimode link of claim 7 in which $\lambda_1$ is in the range of about 850+/−30 nm and $\lambda_2$ is in the range of about 1300+/−30 nm.

* * * * *

UNITED STATES PATENT AND TRADEMARK OFFICE
CERTIFICATE OF CORRECTION

PATENT NO. : 6,363,195 B1
DATED : March 26, 2002
INVENTOR(S) : Abbott John S. et al.

It is certified that error appears in the above-identified patent and that said Letters Patent is hereby corrected as shown below:

<u>Title page,</u>
Item [57], ABSTRACT,
Line 9, "and $\lambda_p$ are provided for the embodiment which includes a" should be
-- and $\lambda_p$ are provided for the embodiment which includes $\alpha$ --

<u>Column 10,</u>
Line 20, "in which $n_2(r)$ is an 60 profile having $\alpha=\alpha_2$ and $0<\alpha_2 \leq 8$." should be
-- in which $n_2(r)$ is an $\alpha$ profile having $\alpha=\alpha_2$ and $0<\alpha_2 \leq 8$. --

<u>Column 12,</u>
Line 7, "link being characterized by an $\alpha=\alpha_{comp}$ and $0.8<\alpha_{comp}21\alpha_2$"
should be -- link being characterized by an $\alpha=\alpha_{comp}$ and $0.8<\alpha_{comp}<\alpha_2$ --

Signed and Sealed this

Nineteenth Day of August, 2003

JAMES E. ROGAN
*Director of the United States Patent and Trademark Office*